Sept. 25, 1962 H. L. DILLINER 3,055,394
REVERSING VALVE

Filed June 25, 1958 2 Sheets-Sheet 1

INVENTOR.
HERMAN L. DILLINER
BY Morton L. Adler
ATTORNEY.

Sept. 25, 1962     H. L. DILLINER     3,055,394
REVERSING VALVE
Filed June 25, 1958     2 Sheets-Sheet 2
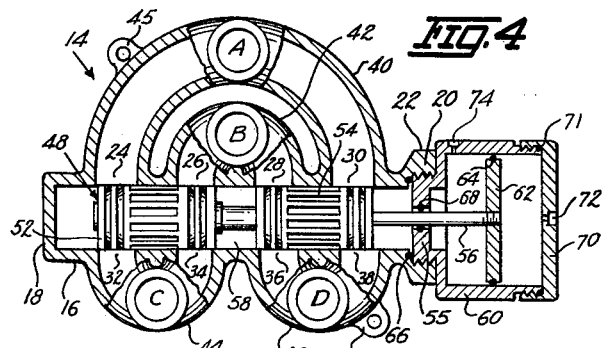
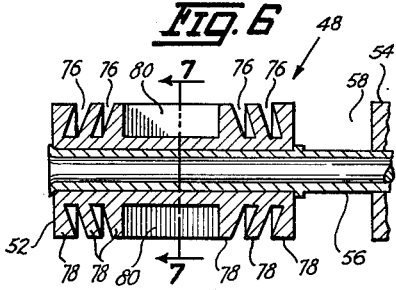
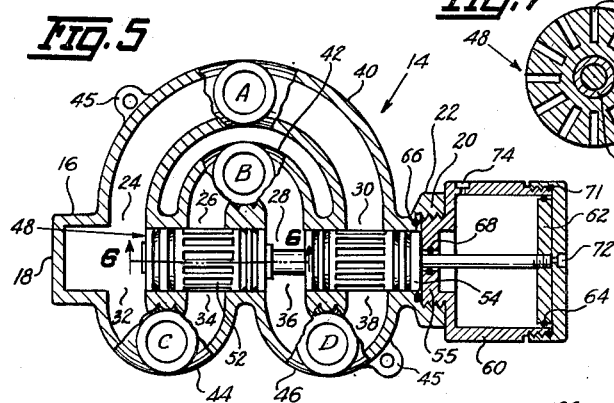
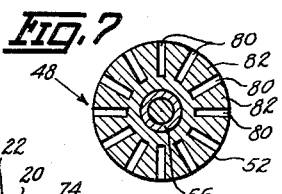
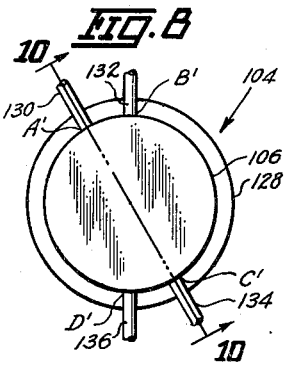
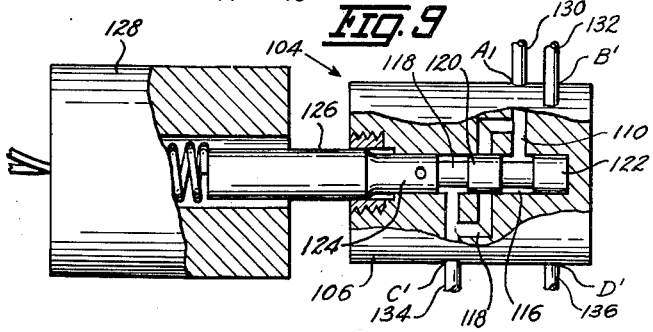
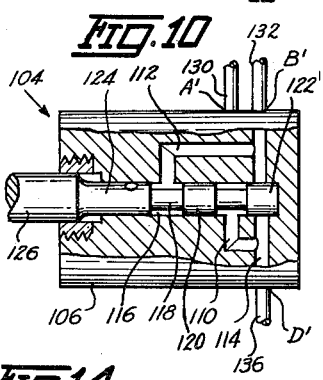
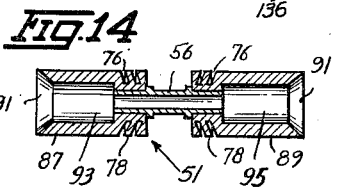
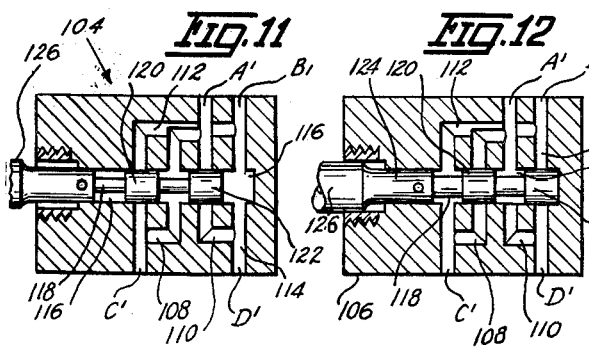
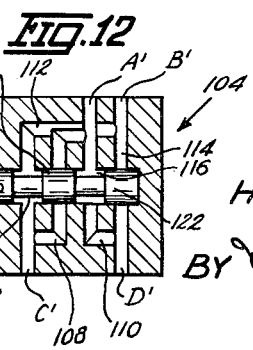
INVENTOR.
HERMAN L. DILLINER
BY Morton S. Adler
ATTORNEY.

3,055,394
REVERSING VALVE
Herman L. Dilliner, Chicago, Ill., assignor to Indico Valve Corporation, Chicago, Ill., a corporation of Illinois
Filed June 25, 1958, Ser. No. 744,446
6 Claims. (Cl. 137—625.29)

My invention relates to valves and, more particularly, to an improved valve for regulating the flow of fluids and gases between selected points.

One of the important objects contemplated by this invention is the provision of a novel valve by which the direction of flow of gas or fluid from a given source can be manually or automatically selectively changed to different destination points.

Another object of this invention includes an improved valve design to reverse the flow of gases or fluids between given points.

A further object inhering herein is the provision with my new valve of a fluid or gas flow control element having improved structure for effectively sealing off selected flow channels at times and also for maintaining effective sealing engagement with the valve housing in the event of expansion of such housing under heat conditions.

Still another object herein is to provide a novel means for automatically operating the control element associated with this valve.

A still further object is to provide an improved valve having particular utility in either a refrigerating system or a heat pump system for reversing the flow of hot gases in a compressor between an evaporator or cooling coil and a condenser coil to effect a defrosting of the evaporator coil by means of the hot gases from the compressor, or to selectively change the cooling coil to a heat producing coil.

Other objects and advantages of this invention reside in the details of construction and correlation of the various parts and will be apparent as the description proceeds.

This invention consists of novel parts and combination of parts to be hereinafter described whereby the objects set forth are attained, as pointed out in the claims, and illustrated in the accompanying drawings, in which:

Figure 1:
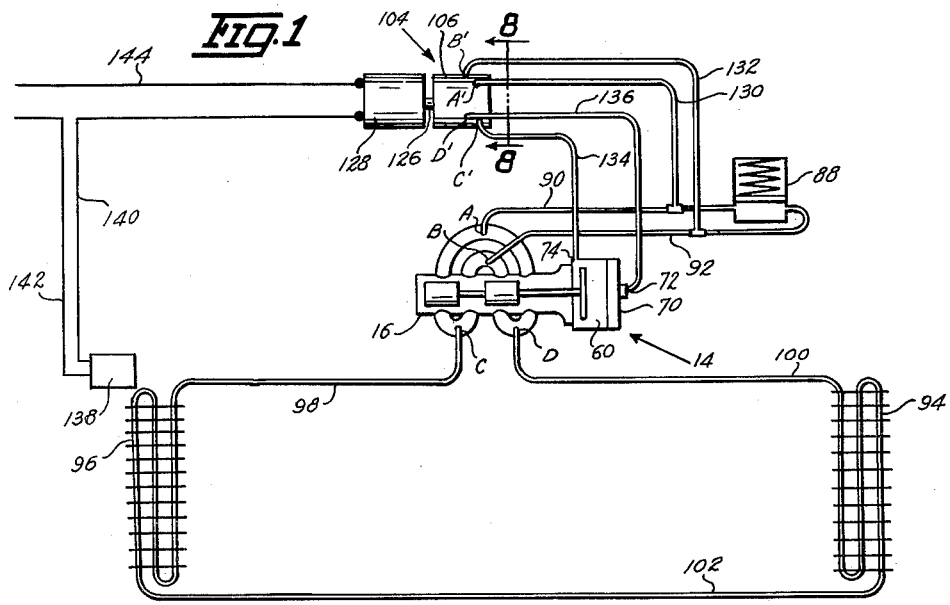
FIG. 1 is a diagrammatic view illustrating this invention in use relative to the evaporator coil and condenser coil of a refrigerating system.
Figures 2, 13:
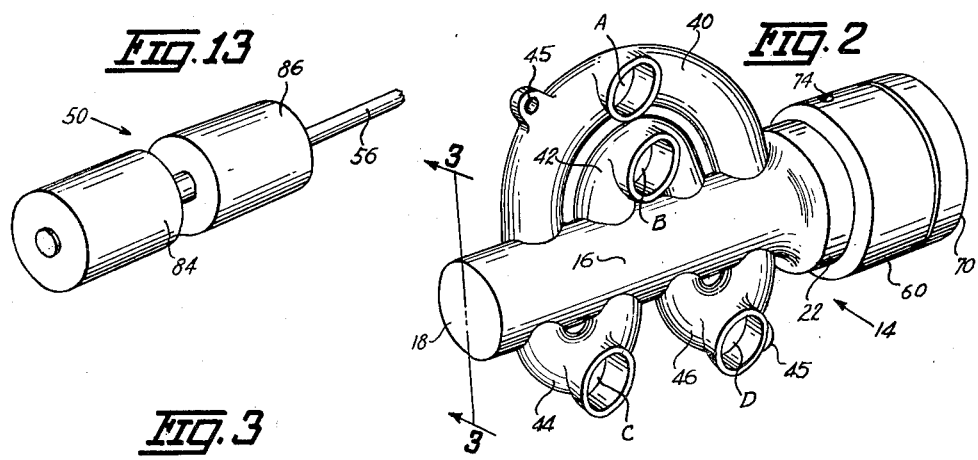
FIG. 2 is a perspective view of this valve.
Figure 3:
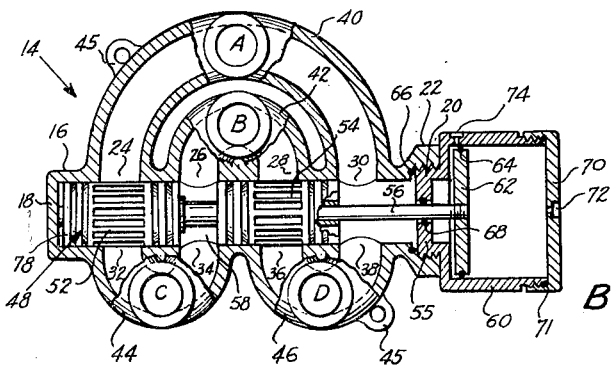

FIG. 3 is a longitudinal sectional view of this valve taken on the line 3—3 of FIG. 2 and showing the spool control element at one extremity of its travel, FIGS. 4 and 5 are sectional views similar to FIG. 3 but showing the control element in different positions, FIG. 6 is a longitudinal sectional view of the spool control element taken on the line 6—6 of FIG. 5, FIG. 7 is a cross sectional view taken on the line 7—7 of FIG. 6, FIG. 8 is an end view of an assembly for operating this valve taken from the line 8—8 of FIG. 1, FIGS. 9 and 10 are side elevational views of the assembly in FIG. 8 partially broken away to illustrate different phases of its construction and operation, FIGS. 11 and 12 are similar respectively to FIGS. 9 and 10 but showing the vents of FIGS. 9 and 10 all on one plane for purposes of clarity, FIG. 13 is a perspective view of a variation of the spool control element of FIG. 6, and FIG. 14 is a reduced longitudinal sectional view of another variation of such spool element.

Referring to the drawings my improved valve is designated generally by the numeral 14 in FIG. 2 and while it is susceptible of a variety of uses, as will become apparent from the description which follows, I have shown it in use in FIG. 1 in a refrigerating system by way of illustration and not as a limitation. Valve 14 includes a general tubular or elongated cylindrical housing 16 closed at one end 18 and terminating at the other end in a concentrically enlarged internally threaded neck 20 defined on the outer side by the flared flange 22. Relative to the position of valve 14 shown in FIGS. 2-5, a plurality of like diameter openings or ports 24, 26, 28 and 30 are formed in the upper wall of housing 16 in longitudinal spaced alignment and oppositely disposed to such respective ports in the lower wall of the housing are the respective like diameter openings or ports 32, 34, 36 and 38. The spacing of these ports is such that the width of the area between ports 24 and 26 and between ports 28 and 30 is the same as the diameter of such ports. This same arrangement is true as between ports 32 and 34 and 36 and 38. Ports 24 and 30 are connected at the outer side of housing 16 by an arcuate tube like conduit 40 which is integral with housing 16 and a similar conduit 42 within the arc of conduit 40 connects openings 26 and 28. Similar conduits 44 and 46 on the outer side of housing 16 connect the respective pairs of ports 32 and 34, and 36 and 38 as shown in FIGS. 2-5. Openings or ports A, B, C and D, respectively, are provided in and are of the same diameter as the respective conduits 40, 42, 44 and 46, and conduit 40 may also have an apertured ear 45 for purposes of mounting. Thus far described, valve 14 is in effect a single unit which may be cast or otherwise suitably formed whereby the interior of housing 16 defines a common chamber with which all of the ports or openings indicated in housing 16 are in communication and with which ports A, B, C and D are also in communication through the respective conduits 40, 42, 44 and 46. The chamber of housing 16 is preferably lined with hard chrome which resists scoring from foreign matter such as solder bits if the conduits are sweated on rather than cast.

To control the flow of gas or fluid through housing 16 in the conduits 40, 42, 44 and 46 I have mounted therein for longitudinal movement a spool assembly of which a preferred embodiment is designated generally by the numeral 48 in FIGS. 6 and 7 and a modified form is indicated by numeral 50 in FIG. 13. Assembly 48 comprises a pair of cylindrical members or spools 52 and 54 and in longitudinal spaced relationship on a rod or stem 56 with the space 58 between the spools equal to the diameter of the like sized openings 24, 26, 28, 30, 32, 34, 36 and 48. The diameter of the spools 52 and 54 are such to permit movement relative to the inner walls of housing 16 and at the same time to effect a gas or fluid sealing engagement therebetween. The effectiveness of such seal is enhanced by using any flexible material such as nylon or the like for spools 52 and 54 within the metal housing 16 due to the relative co-efficient of expansion of the respective materials as will be referred to later. From one end of assembly 48, rod 56 projects and extends through a bearing neck 55 of a cylindrical housing 60 and terminates therein in a transversely arranged piston-like head member 62 having a peripheral seal 64 in slidable engagement with the inner walls thereof. Neck 55 is externally threaded for screwable attachment to neck 20 on housing 16 as shown in FIGS. 3-5. An O seal ring 66 is placed intermediate neck members 20 and 55 and a like ring 68 is placed in neck 55 around rod 56. A cap 70 with O ring 71 is attached to the outer end of housing 60 and in such cap I provide an orifice 72, and a similar orifice 74 is placed in housing 60 at its inner end near neck portion 55. Both orifices 72 and 74 are thus in communication with the interior of housing 60 and at opposite ends thereof relative to the direction of the longitudinal axis of housing 16.

The assembly 48 is longitudinally movable relative to housing 16 as indicated with its extreme position toward valve end 18 shown in FIG. 3 and its extreme position toward the other end shown in FIG. 5. The effect of assembly 48 in controlling fluid or gas flow in these respective positions is as follows. Port A is capable of communicating with port C through one end of conduit 40, ports 24 and 32 and conduit 44, and with port D through the other end of conduit 40, ports 30 and 38 and conduit 46. Port B is also capable of communicating with port C through conduit 42, ports 26 and 34 and conduit 46, and with port D through port 42, ports 28 and 36 and conduit 46. Conversely ports C and D are each capable of communicating with the respective ports A and B and this is mentioned since all ports A, B, C and D may be used as inlets or outlets as the circumstances may require. At no time, however, are ports A and B, for example, simultaneously in full communication with either ports C or D or C and D simultaneously in full communication with either A or B. As noted in FIG. 3, spool 52 has closed ports 24 and 32 and spool 54 has closed ports 28 and 36. At the same time space 58 between the spools register with ports 26 and 34 to afford communication therethrough and ports 30 and 38 are open. Thus port A communicates only with port D and vice versa, and port B communicates only with port C and vice versa. By the shifting of assembly 48 to the position shown in FIG. 5, ports 24 and 32 are open, spool 52 closes ports 26 and 34, space 58 between the spools registers with ports 28 and 36 and spool 54 closes ports 30 and 38. In this position port A communicates only with port C and vice versa, and port B communicates only with port D and vice versa. It will thus be appreciated that flow into port A for example can be selectively directed either to port C or D, and flow out of port B for example, can come from whichever of ports C or D is not at the time in communication with port A.

The sealing engagement between assembly 48 and the several ports within housing 16 is considerably enhanced by my improved structure thereof as shown in FIGS. 6 and 7. Here each spool 52 and 54 is provided on each end portion with one or more circumscribing slots 76 each inclined from the perimeter of the spool downwardly toward the respective adjacent spool end so as to form one or more relative narrow or thin flange-like peripheral strips 78. In the center portion of each spool intermediate the innermost slot 76 on each end portion I have provided a plurality of radially disposed spaced slots 80 (FIG. 7) which extend parallel to the longitudinal axes of the respective spools and thus are disposed transversely of slots 76. The spacing of slots 80 is designed to form the thin strip elements 82. Thus formed, spools 52 and 54 are preferably made of a suitable flexible material such as nylon whereby members 78 and 82 are susceptible of flexibility under pressure. The relationship of elements 78 and 82 to the ports within housing 16 are shown in FIGS. 3-5 and thus vertical pressure between the upper and lower ports in housing 16 will cause flexing of elements 82 to increase their sealing contact with the adjacent walls and any lateral pressure therein will flex the elements 78 for the same effect. The use of a nylon spool contributes to the efficiency of this seal and generally contributes to the overall efficiency of the seal because of its higher co-efficient of expansion relative to the metal valve housing. For this reason a spool assembly 50 (FIG. 13) having smooth surfaced spools 84 and 86 and assembly 51 (FIG. 14) which has slots 76 only on the inner ends of spools 87 and 89 can also be successfully used. It will be understood, however, that while I recommend nylon spools with the metal housing for the reason indicated, any suitable material having the same or higher co-efficient of expansion as the valve housing may also be used.

The operation or movement of assembly 48 may be accomplished in any desirable manner such as manually by a push pull rod connected to head 62 or by a solenoid in a form that is well within the purview of the art. The means for operating assembly 48 may vary under different conditions of use and in the illustrated novel use which I shall describe I will disclose a novel means for automatic operation thereof. With reference to FIG. 1 there is shown diagrammatically sufficient components of a refrigerating system to describe one form of use for valve 14. Such system includes generally a compressor 88 with the discharge or compression line 90, return or suction line 92, condenser coil 94 and evaporator coil 96, and will also include such elements as a pump, expansion valve and other parts well known but which are not here material and are thus not shown. Compression line 90 is connected to port A and suction line 92 is connected to port B. Port C connects to the evaporator 96 by line 98 and port D connects by line 100 to the condenser 94. Coils 94 and 96 are connected by flow line 102. With valve 14 thus imposed in the circulating system shown and with spool assembly 48 positioned as shown in FIG. 1 and illustrated in more detail in FIG. 3, the normal flow circuit for cooling of coil 96 will be from the compressor 88 through line 90 to port A, through housing 16 to port D, through line 100 to and through condenser 94, through line 102 to and through coil 96, through line 98 to port C, through housing 16 to port B and back to compressor 88 in line 92. Under certain conditions of operation as is well known, coil 96 may become so covered with frost that its efficiency is materially impaired and therefore requires defrosting. In this respect valve 14 has particular utility since by movement of assembly 48 to the position shown in FIG. 5, hot gases from the compression line 90 entering port A are directed out of port C to coil 96 to thereby reverse the gas flow between coils 94 and 96 to and from valve 14 as described above for normal refrigerating operation. Such a flow reversal provides heat from the compressor 88 to coil 96 to defrost the same.

As stated earlier, assembly 48 of valve 14 may be operated in any desired manner but for efficiency and economy I have devised a novel means of doing so which I shall now describe. Assembly 48 as described will move under approximately six pounds or more of pressure and I have found that the cost of a solenoid for this purpose connected, for example, directly to stem 56 is very expensive and thus not desirable from the standpoint of producing this valve at a competitive cost. I have therefore made a solenoid operated pilot valve assembly 104 (FIGS. 1, and 9-13) which is in effect a miniature in principle of valve 14. Assembly 104 comprises a cylindrical body 106 having spaced peripheral ports A', B', C' and D' corresponding respectively to ports A, B, C and D on valve 14 (FIGS. 2-5). As seen in FIGS. 11 and 12 where all ports in assembly 104 are shown on one plane for purposes of clarity and illustration, port A' can communicate with port C' through passageway 108 and with port D' through passageway 110. Port B' communicates with port C' by passageway 112 and with port D' by passageway 114. Passageways 108, 110, 112 and 114 all communicate with the common chamber 116 in body 106 and longitudinally slidable in chamber 116 is a shaft 118 concentrically smaller than such chamber. In spaced relationship on shaft 118 are the spools 120 and 122 which are concentrically larger than shaft 118 and in slidable sealing engagement with the walls of chamber 116. Shaft 118 with spools 120 and 122 is a miniature of assembly 50 (FIG. 13) and operates to open and close communication between ports A', B', C' and D' in the same manner and in the same relationship as described for assembly 48. Thus the position of shaft 118 in FIG. 12 corresponds to assembly 48 in FIG. 3 and FIG. 11 corresponds to FIG. 5. In other words, port A' in FIG. 12 is in communication with port D' and port B' is in communication with port C' which is the same relative arrangement shown in FIG. 3 between ports A and D, and B and C.

Shaft 118 is suitably coupled as at 124 to a spring loaded solenoid arm 126 projecting from housing 128 disposed as shown in FIGS. 9–12 and will be operated when the solenoid is actuated in a well known manner. Port A′ is connected by conduit 130 to compression line 90 from compressor 88 (FIG. 1) the same as port A, and port B′ is connected to the return of suction line 92 by line 132 the same as port B. Port C′ is connected by conduit 134 to orifice 74 in housing 60 and port D′ connects by line 136 to orifice 72 in cap 70. A thermal sensing element 138 of any desirable type is placed in operating relationship to coil 96 and is electrically connected to solenoid housing 128 by lead 140. Leads 142 and 144 respectively connect unit 138 and solenoid 128 to a source of electrical current in a well known manner.

With valve assembly 104 constructed and arranged as described it will operate in the following manner. For normal cooling of coil 96 as set forth earlier, assembly 48 will be positioned as shown in FIG. 3 and assembly 104 will be correspondingly positioned as shown in FIG. 12. Here compression from line 90 will act on both assemblies 48 and 104. Through assembly 104 compression enters port A′ and is discharged through port D′ into orifice 72 (FIG. 3) against one side of piston head 62 to move assembly 48 whereby port A also receiving compression from line discharges the same through port D to coil 94. Any gas or fluid in housing 60 is expelled through orifice 74 to port C′. When coil 96 becomes frosted to a point to actuate element 138, solenoid 128 is actuated to move assembly 104 to the position shown in FIG. 5. This places port A′ in communication with port C′ whereby compression from line 90 is now directed to orifice 74 against the other side of piston head 62 and thus move assembly to the position shown in FIG. 5 where port A communicates with port C and reverses the flow of hot compressor gas to coil 96. Here orifice 72 will communicate with port D′. As soon as 96 is sufficiently defrosted to break contact with element 138, solenoid 128 is deactivated and shifts assembly 48 by its spring action. This is a complete automatic operation for shifting assembly 48 as needed and it is pointed out that assembly 48 does not have to move to an extreme position at any end before it can be reversed. It can reverse in the middle of a shift if the pilot control elements 128 and 138 should call for a shift at any position, and as long as a pressure differential exists between ports A and B, for example, and the distance between ports is equal to the diameter of the ports, assembly 48 cannot be stalled in any position intermediate its end position.

Assembly 104 is relatively inexpensive to construct and has proven extremely efficient and durable in performing the function for which it was designed. Such an assembly as shown at 104 is particularly useful when valve 14 is associated with a compressor because of the availability of compression for moving assembly 48. However, it will be understood that valve 14 may be used under conditions where no compressor is present and in such situations any suitable means may be employed for operating assembly 48. It will also be understood that by shifting the direction of flow of hot compressor gases between coils 94 and 96 that such coils can be selectively changed from cold air producing elements to hot air producing elements and vice versa and this is an important feature in the manufacture of combination heating and cooling units.

Relative to spool assemblies 48, 50 and 51, it is further pointed out that stem 56 is provided with a minute tolerance with the respective spools to provide for a bypass or pressure bleed through of gas or fluid and which structure in addition permits the spool member a slight flexibility on such stem to align themselves for proper sealing engagement with the openings into housing 16. Also the use of nylon spool by virtue of their higher coefficient of expansion relative to housing 16, permits them to contract automatically when the compressor stops and allows a bypass of pressure to equalize the system and relieve the starting load on the compressor.

On spool assembly 51, the use of inwardly tapered ends 91 provides suitable sealing at such ends due to the radial expansion of the tapered portion under pressure and due to the recessed socket portions 93 and 95 in the respective spools 87 and 89 of FIG. 14, gas or fluid under pressure which may leak into either of such sockets will act against both spools due to the bleed-through along shaft 56 and increase the sealing engagement of such spools relative to housing 16.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:

1. In a valve housing having a plurality of longitudinally spaced openings, a means for selectively opening and closing said openings comprising, a shaft disposed in said housing for movement relative thereto, spaced spools of flexible material on said shaft movable therewith and in sealing engagement with the walls of said housing, means to move said shaft in two opposite directions respectively to selectively open and close said openings in a predetermined pattern, and each of said spools provided on each end portion with a peripheral groove to form a flexible peripheral flange slanted toward a source of pressure and thereby susceptible of being flexed under fluid or gas pressure so as to be squeezable against the housing walls.

2. In a valve housing having a plurality of longitudinally spaced openings, a means for selectively opening and closing said openings comprising, a shaft disposed in said housing for movement relative thereto, spaced spools of flexible material on said shaft movable therewith and in sealing engagement with the walls of said housing, means to move said shaft in two opposite directions respectively to selectively open and close said openings in a pre-determined pattern, each of said spools provided on each end portion with a peripheral groove to form a flexible peripheral flange slanted toward a source of pressure and squeezable against the housing walls under pressure, and each spool provided intermediate said peripheral grooves with a plurality of radially disposed spaced grooves extending parallel to the longitudinal axes thereof to form flexible strip members intermediate such grooves and which are slanted toward a source of pressure and squeezable against the housing walls under pressure.

3. In a valve housing having a plurality of longitudinally spaced openings, means for selectively opening and closing said openings comprising, a shaft disposed in housing for movement relative thereto, spaced spools of flexible material on said shaft movable therewith and in sealing engagement with the walls of said housing, means to move said shaft in two opposite directions respectively to selectively open and close said openings in a predetermined pattern, and each of said spools provided on at least one end portion with a peripheral groove to form a flexible peripheral flange slanted toward a source of pressure and thus susceptible of being flexed under gas or fluid pressure so as to be squeezable against the housing walls.

4. In a valve housing having a plurality of longitudinally spaced openings, a means for selectively opening and closing said openings comprising, a shaft disposed in said housing for movement relative thereto, elongated spaced spools on said shaft movable therewith and in sealing engagement with the walls of said housing, one end portion of each spool defining a relatively narrow flexible circumscribing strip of like diameter as said spool by means of a circumscribing groove closely adjacent said end, said strip being slanted toward a source of pressure and by reason of its narrowness being susceptible of flexing under gas or fluid pressure so that in flexed position its diameter will exceed that of said spool, and means to move said shaft in two opposite directions respectively to selectively open and close said openings in a predetermined pattern.

5. In a valve housing having a plurality of longitudinally spaced openings, a means for selectively opening and closing said openings comprising, a shaft disposed in said housing for movement relative thereto, elongated spaced spools on said shaft movable therewith and in sealing engagement with the walls of said housing, portions of the surface of each spool defining relatively narrow flexible strips by means of spaced grooves, said strips being slanted toward a source of pressure and by reason of their narrowness being susceptible of flexing under fluid or gas pressure in said grooves so that in flexed position portions of said strips will project radially beyond the normal diameter of said spools, and means to move said shaft in two opposite directions respectively to selectively open and close said openings in a predetermined pattern.

6. A device as defined in claim 5 wherein said spools are of flexible material and provided with a recessed socket on their respective outer ends so that fluid or gas pressure within said sockets will effect a radial expansion of said spools in sealing engagement with the openings in said housing, and wherein a minute tolerance is provided between said shaft and said spools to provide both a pressure bleed through means between said sockets and to impart to said spools a slight flexibility on said shaft for aligning themselves in proper sealing engagement within said housing.

References Cited in the file of this patent
UNITED STATES PATENTS

| | | |
|---|---|---|
| 1,123,273 | Gregersen | Jan. 5, 1915 |
| 1,820,653 | Ernest | Aug. 25, 1931 |
| 2,045,113 | Ward | June 23, 1936 |
| 2,471,285 | Rice | May 24, 1949 |
| 2,506,111 | Saint | May 2, 1950 |
| 2,630,825 | Stephens | Mar. 10, 1953 |
| 2,665,179 | Salvatora | Jan. 5, 1954 |
| 2,714,394 | Moran | Aug. 2, 1955 |
| 2,738,159 | Fleming | Mar. 13, 1956 |
| 2,770,443 | Rand | Nov. 13, 1956 |
| 2,803,110 | Chittenden | Aug. 20, 1957 |
| 2,841,168 | Levetus et al. | July 1, 1958 |
| 2,844,166 | Edman | July 22, 1958 |
| 2,896,905 | Stehlin | July 28, 1959 |
| 2,903,236 | Holycross et al. | Sept. 8, 1959 |